United States Patent [19]

Narukawa et al.

[11] Patent Number: 5,746,780
[45] Date of Patent: May 5, 1998

[54] METHOD OF MANUFACTURING A BATTERY CONTAINING A NON-CIRCULAR SPIRAL ELECTRODE UNIT

[75] Inventors: Satoshi Narukawa, Sumoto; Toru Amazutsumi, Tsuna-gun; Hideki Fukuda; Hiyoshi Tamaki, both of Sumoto, all of Japan

[73] Assignee: Sanyo Electric Co., Ltd., Moriguchi, Japan

[21] Appl. No.: 656,827

[22] Filed: Jun. 3, 1996

[30] Foreign Application Priority Data

Jun. 12, 1995 [JP] Japan ................... 7-144367

[51] Int. Cl.$^6$ ............................................ H01M 10/04
[52] U.S. Cl. ............................ 29/623.1; 429/94
[58] Field of Search .................... 429/94; 29/623.1

[56] References Cited

U.S. PATENT DOCUMENTS

| | | | |
|---|---|---|---|
| 418,483 | 12/1889 | Woolf | 429/94 |
| 3,377,201 | 4/1968 | Wagner et al. | 429/94 |
| 5,336,276 | 8/1994 | Pensabene et al. | 429/223 X |
| 5,344,724 | 9/1994 | Ozaki et al. | 429/44 |
| 5,443,925 | 8/1995 | Machida et al. | 429/94 |
| 5,478,594 | 12/1995 | Frye et al. | 429/223 X |

FOREIGN PATENT DOCUMENTS 60-25164  2/1985  Japan.

*Primary Examiner*—Stephen Kalafut
*Attorney, Agent, or Firm*—Wenderoth, Lind & Ponack

[57] ABSTRACT

A method of manufacturing a battery containing a non-circular spiral electrode unit forms a true circular or elliptical cylindrical electrode unit by winding positive and negative electrode plates with a micro-porous polymer film separator disposed between the two electrode plates. The cylindrical electrode unit is pressed from both sides into a non-circular spiral electrode unit and inserted into an external case to form a battery. When the cylindrical electrode unit is pressed into a non-circular spiral electrode unit, the separator gurley value of the pressed non-circular spiral electrode unit is arranged to be in the range from 110% to 150%, where the separator gurley value of the cylindrical electrode unit is 100%.

18 Claims, 6 Drawing Sheets

METHOD OF MANUFACTURING A BATTERY CONTAINING A NON-CIRCULAR SPIRAL ELECTRODE UNIT

BACKGROUND OF THE INVENTION

The present invention relates to a method of manufacturing a battery having an electrode group with positive and negative electrode plates which are wound into a non-circular spiral shape.

It is necessary to form a spiral electrode unit into a non-circular shape to house it in an external case with a rectangular shape (square corners). As shown in the cross-section of FIG. 1, the electrode unit is fabricated by winding a positive electrode plate 2A and a negative electrode plate 2B sandwiching a separator 2C into a non-circular spiral shape. It is difficult to efficiently manufacture non-circular spiral electrode units by this method. In particular, it is difficult to rapidly wind up two electrode plates and a separator 2C in a non-circular shape while regulating tension to a constant value. This is because the electrode plate and separator winding speed of the non-circular electrode unit varies dramatically depending on the angle of rotation. Tension variation on the electrode plates and separator causes variation in the degree of intimate contact (referred to as tightness in the following) between the positive electrode and the separator and between the negative electrode and the separator within the electrode unit being wound up. When the electrode plates and the separator are wound with a strong pulling tension, there is a high degree of tightness. On the contrary, when the electrode plates and the separator are wound with little tension, there is a low degree of tightness. When the battery electrode unit is not wound tightly, internal resistance increases and high rate characteristics are degraded. Consequently, it is important to wind up the electrodes with a high degree of tightness. However, if the average tension is increased during winding of the non-circular electrode unit 2, the electrode plates or separator 2C will be damaged when maximum tension is applied. For this reason average tension on the electrode plates and separator 2C cannot be increased. This results in a lower degree of tightness.

To increase average tension during winding of the electrode plates and separator, the inventor and others have developed a method of winding the electrode plates and separator in a true circular shape making a cylindrical electrode unit which is then pressed from both sides producing a non-circular spiral electrode unit. This method fabricates a circular cylindrical electrode unit which allows the electrode plates and separator to be wound up at a uniform speed. This reduces tension variation during electrode unit winding. Therefore, average tension can be increased to wind the electrode plates and separator in good intimate contact. Further, since this method compresses the cylindrical electrode unit into a non-circular cylindrical electrode unit, tightness is increased. Still further, since it is possible to wind the electrode plates and separator at a uniform rate by this method, winding speed can be increased at a constant tension. This method has the feature that circular cylindrical electrode units can be manufactured efficiently in quantity.

However, in this method battery performance decreases as the force with which the cylindrical electrode unit is compressed increases. This is because ion permeability of the porous polymer film separator decreases with compression force. A separator with reduced ion permeability causes degradation of the battery's high rate discharge characteristics as well as reduction in cycle life. FIG. 2 shows the degradation in high rate discharge characteristics as a function of the battery's separator ion permeability. FIG. 3 shows cycle lifetime reduction. The horizontal axis of both FIGS. 2 and 3 is a separator gurley value expressed as a percentage, which indicates separator ion permeability. FIGS. 2 and 3 are graphs of lithium ion rechargeable battery characteristics for batteries with cylindrical electrode units fabricated under the same conditions but compressed with different pressures to vary separator gurley value.

Separator gurley value is the time required for a given volume of air to pass through a separator. This means it is difficult for air to pass through a separator with a high gurley value and ion permeability is low. A separator gurley value is measured using measurement equipment made in accordance with Japanese Industrial Standard JIS-P8117. In this application, porosity values are those measured using a Toyo Precision Instrument Manufacturing Co. Inc. (Toyo Seiki KK) Galle type densometer G-B2C.

As shown in FIGS. 2 and 3, high rate discharge characteristics and cycle lifetime are degraded as separator gurley values increase, or in other words as it becomes more difficult for ions to penetrate through the separator. FIG. 2 shows that lithium ion rechargeable battery real discharge capacity decreases for 3C discharge. This figure shows the degree to which 3C discharge capacity decreases compared to discharge at 1C. Consequently, the discharge capacity at 1C is set to 100%. The battery capacities shown are for fully charged lithium ion rechargeable batteries to discharge to 2.75V. It is clear from FIG. 2 that high rate discharge characteristics degrade as the separator gurley value increases for lithium ion rechargeable batteries containing non-circular spiral electrode units.

FIG. 3 shows battery capacity after repeating 300 charge-discharge cycles. This figure sets battery capacity immediately after fabrication to 100% and shows the degree to which battery capacity decreases due to charge-discharge cycle repetition. The lithium ion rechargeable batteries are first charged by constant current at 1C until 4.1V is reached. Subsequently they are charged by constant voltage until fully charged. Discharge current is set to 1C and discharge is stopped at 2.75V. FIG. 3 clearly shows gradually decreasing battery capacity as the separator gurley value increases and ion penetration becomes more difficult.

The results of measurements graphed in FIGS. 2 and 3 clearly indicate high rate discharge characteristic and cycle lifetime degradation as cylindrical electrode units are strongly compressed. Consequently, non-circular spiral electrode units of prior art batteries are made by taking care not to degrade separator permeability when the cylindrical electrode units are compressed. As a result, properties of these non-circular spiral electrode units are not always sufficient to satisfy desired characteristics, and there is an earnest desire for improved battery performance. In particular, there are many electrical equipment applications which can take advantage of the large battery capacity inherent to the lithium ion rechargeable battery which contains a non-circular spiral electrode unit. Therefore, how large battery capacity can be made is an extremely important subject.

The inventor and others repeatedly performed large scale experiments on the method of manufacturing non-circular spiral electrode units by compressing cylindrical electrode units. As a result, there was success in considerably improving battery performance by fabricating non-circular spiral electrode units under precisely prescribed conditions. It is thus a primary object of the present invention to provide a method of manufacturing a battery containing a non-circular spiral electrode unit which is uncomplicated, easily implemented, efficient for manufacture in quantity, and can improve battery performance.

The above and further objects and features of the invention will more fully be apparent from the following detailed description with accompanying drawings.

SUMMARY OF THE INVENTION

The method of manufacturing a battery containing a non-circular spiral electrode unit of this invention fabricates a battery in the following manner to achieve the previously stated object. A separator, which is a polymer film with micro-pores, is sandwiched between a positive electrode plate and a negative electrode plate and is wound into a true circular or elliptical cylindrical electrode unit. This cylindrical electrode unit is pressed from both sides to form a non-circular spiral electrode unit. The non-circular spiral electrode unit is inserted into an external case to complete battery fabrication.

In the manufacturing method of the present invention, when the cylindrical electrode unit is pressed into a non-circular spiral electrode unit, the separator gurley value of the pressed non-circular electrode unit is from 110% to 150%, where the separator gurley value of the unpressed cylindrical electrode unit is 100%.

When the electrode unit is pressed into a non-circular spiral shape and the ion permeability of the separator decreases, or in other words the gurley value of the separator increases, its performance as a battery becomes worse. In particular, high rate discharge characteristics rapidly become worse as the gurley value of the separator increases. Prior art batteries manufactured up to now have non-circular spiral electrode units made by not strongly pressing the cylindrical electrode unit and thereby avoiding degradation of the high rate discharge characteristics and cycle lifetime.

However, surprisingly when the separator gurley value is adjusted within a restricted range, battery performance does not degrade, but to the contrary, battery performance improves remarkably. FIGS. 4 and 5 show high rate discharge characteristic and cycle lifetime improvement by lithium ion rechargeable batteries containing non-circular spiral electrode units manufactured by the method of the present invention. As shown in FIGS. 2 and 3, battery performance becomes steadily worse as cylindrical electrode units are strongly pressed increasing the separator gurley value. However, in the method which presses a cylindrical electrode unit into a thin non-circular spiral electrode unit, the thinly compressed electrode plates can be made longer or can be made with more active material. Fortunately, when the electrode plates in a thinly pressed cylindrical electrode unit are lengthened or when the quantity of their active material is increased, battery performance can be improved by an amount greater than the high rate discharge degradation by adjusting the separator gurley value within a prescribed range.

FIG. 4 shows battery high rate discharge characteristics measured under the same conditions as FIG. 2. FIG. 4 shows that by including more active material battery capacity can be increased when cylindrical electrode units are formed into non-circular electrode units with increasing gurley value. This graph shows the ratio of increase in battery capacity taking 100% battery capacity (0 on the vertical axis) to be that for a 100% separator gurley value. It can be seen from this graph that high rate discharge characteristics can be improved from 2% to more than 3.5% by adjusting the separator gurley value to be from 110% to 150%. Therefore, high rate discharge characteristics, formerly believed to rapidly degrade as cylindrical electrode units are strongly pressed, can be improved remarkably by including more active material and by adjusting the separator gurley value within a prescribed range.

Further, as shown in FIG. 5, cycle lifetime is improved even more than high rate discharge characteristics. FIG. 5 shows battery capacity under the same conditions as FIG. 3 for batteries cycled through 300 charge-discharge cycles. This graph shows that battery capacity after 300 charge-discharge cycles can be increased by increasing the quantity of active material and by increasing pressing force on the cylindrical electrode unit to make separator gurley value within a prescribed range. This graph shows the ratio of possible increase in battery capacity taking 100% battery capacity (0 on the vertical axis) to be that for 100% separator gurley value. It can be seen from this graph that battery capacity after 300 charge-discharge cycles can be improved from 3% to 7% for a battery of the present invention by adjusting the separator gurley value to be from 110% to 150%.

DETAILED DESCRIPTION OF THE INVENTION

Figure 6:
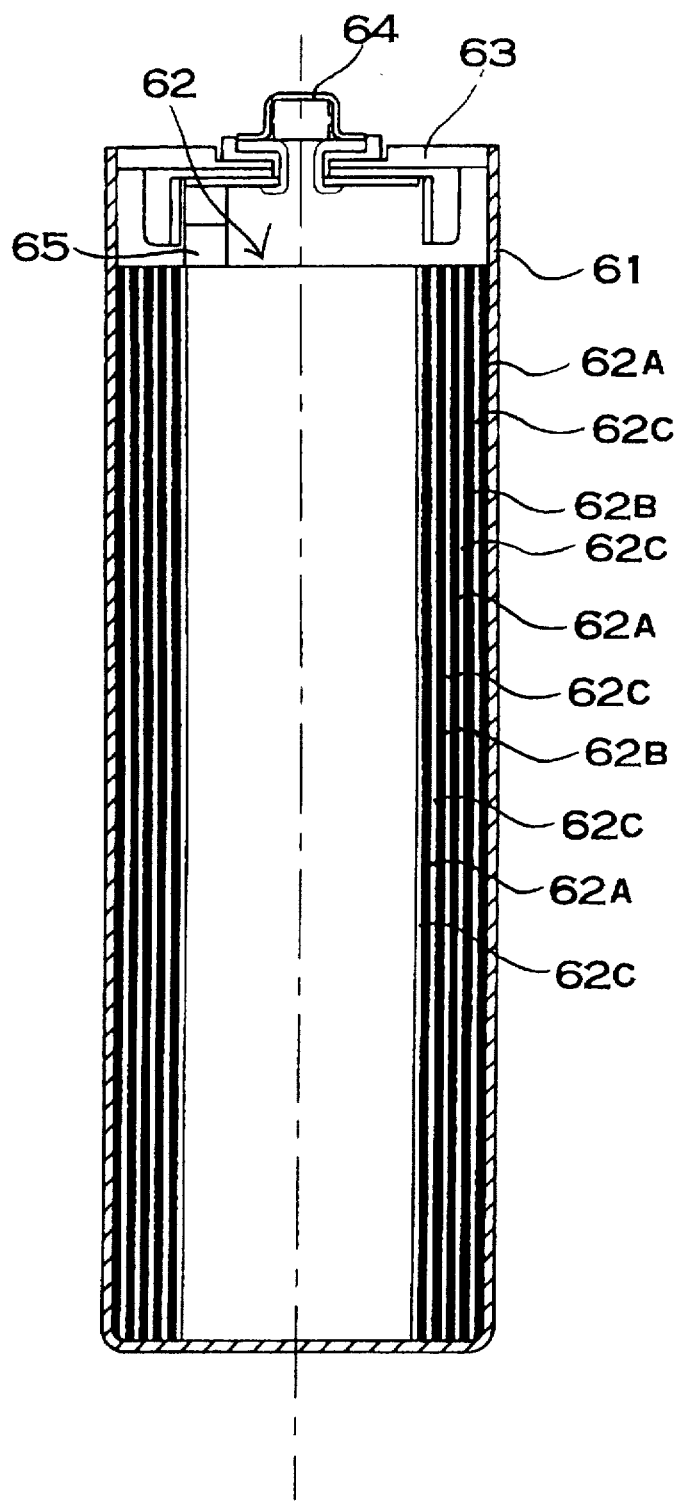
FIG. 6 is a cross-section view of a non-circular spiral electrode unit housed in a square battery of an embodiment of the present invention.

The battery made by the method of the present invention and shown in FIG. 6 is a lithium ion rechargeable battery which contains a non-circular spiral electrode unit 62. However, the present invention does not restrict the battery to be a lithium ion rechargeable battery. It may also be a nickel cadmium or nickel hydrogen battery. The battery in FIG. 6 is a hermetically sealed square (square cornered) battery. The battery comprises an aluminum or aluminum alloy external case 61 with a non-circular spiral electrode unit 62 housed inside.

The external case 61 has outside dimensions of 48 mm in height, 22 mm in width, 8.1 mm in thickness, and 0.5 mm of aluminum case material thickness. However, the present invention does not limit the external case to a specific shape, size, material, or material thickness. The external case may also be made of iron or iron alloys (steel, etc.).

The open area of the external case 61 is hermetically closed off by a sealing plate 63. The perimeter of the sealing plate 63 is weld attached to the inside surface of the external case 61 by a method such as laser welding. The sealing plate 63 has a negative electrode terminal 64 projecting outward from its top surface. The negative electrode terminal 64 is electrically insulated from the sealing plate 63 by an insulating gasket and is fixed to the sealing plate 63 in a hermetic fashion. The negative electrode terminal 64 is connected to a collecting terminal fixed to the bottom surface of the sealing plate 63. An insulating plate is sandwiched between the collecting terminal and the sealing plate 63 to electrically insulate the collecting terminal from the sealing plate 63. The collecting terminal is connected to a negative electrode tab 65 on the non-circular spiral electrode unit 62. The negative electrode plate 62B of the non-circular spiral electrode unit 62 is connected to the negative electrode terminal 64 via the negative electrode tab 65 and the collecting terminal.

Figure 1:
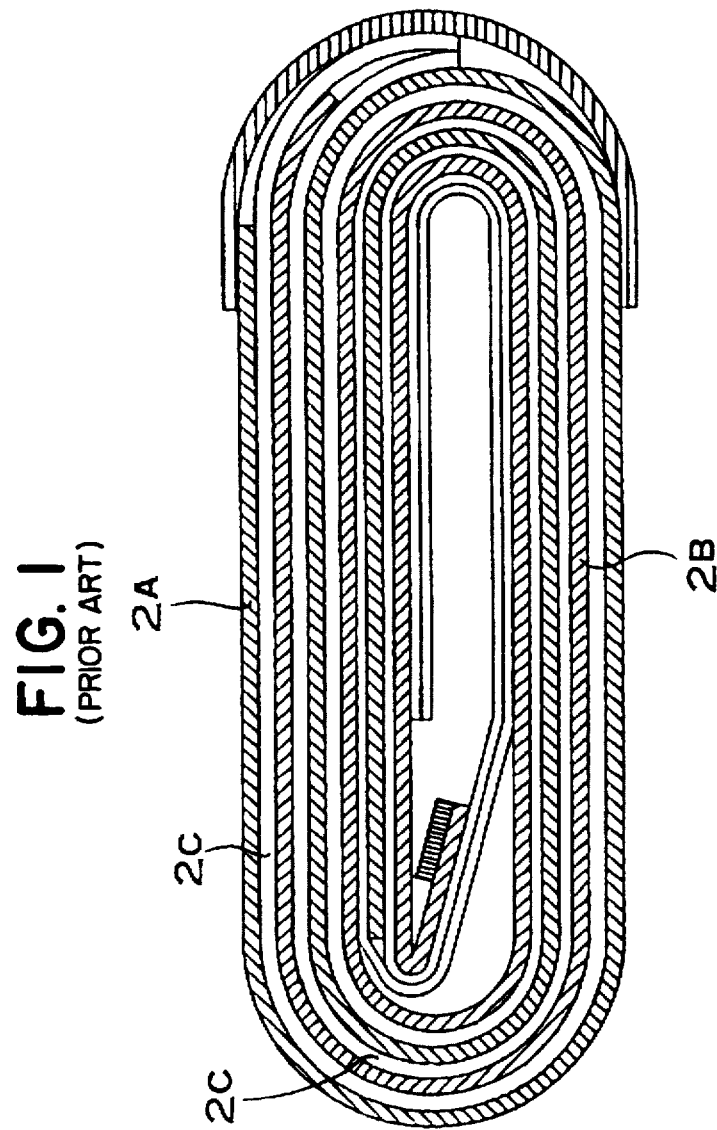
FIG. 1 is a cross-section view of a non-circular spiral electrode unit which is housed in a square battery.
Figure 2:
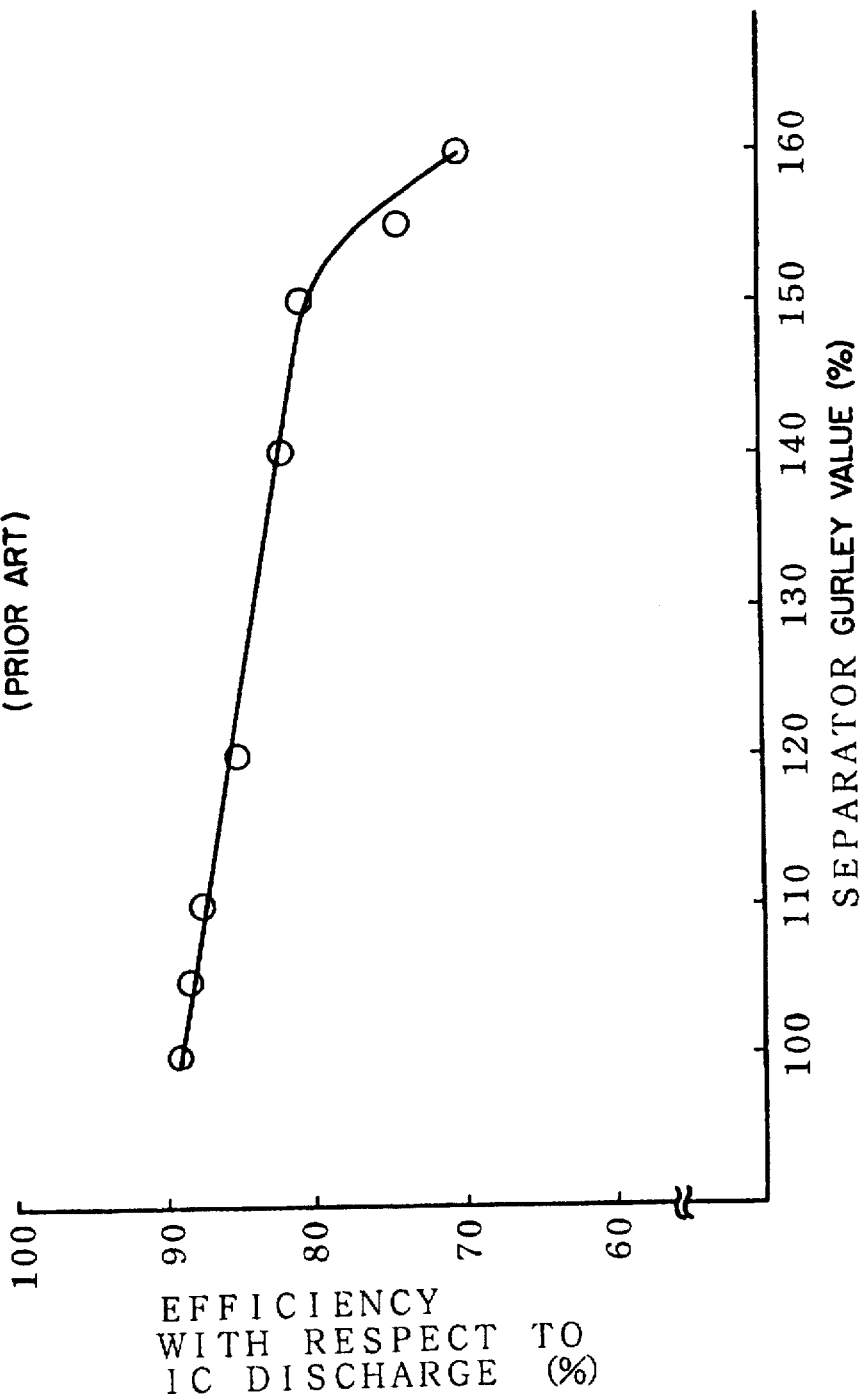
FIG. 2 is a graph showing high rate discharge characteristics of batteries manufactured by a prior art method.
Figure 3:
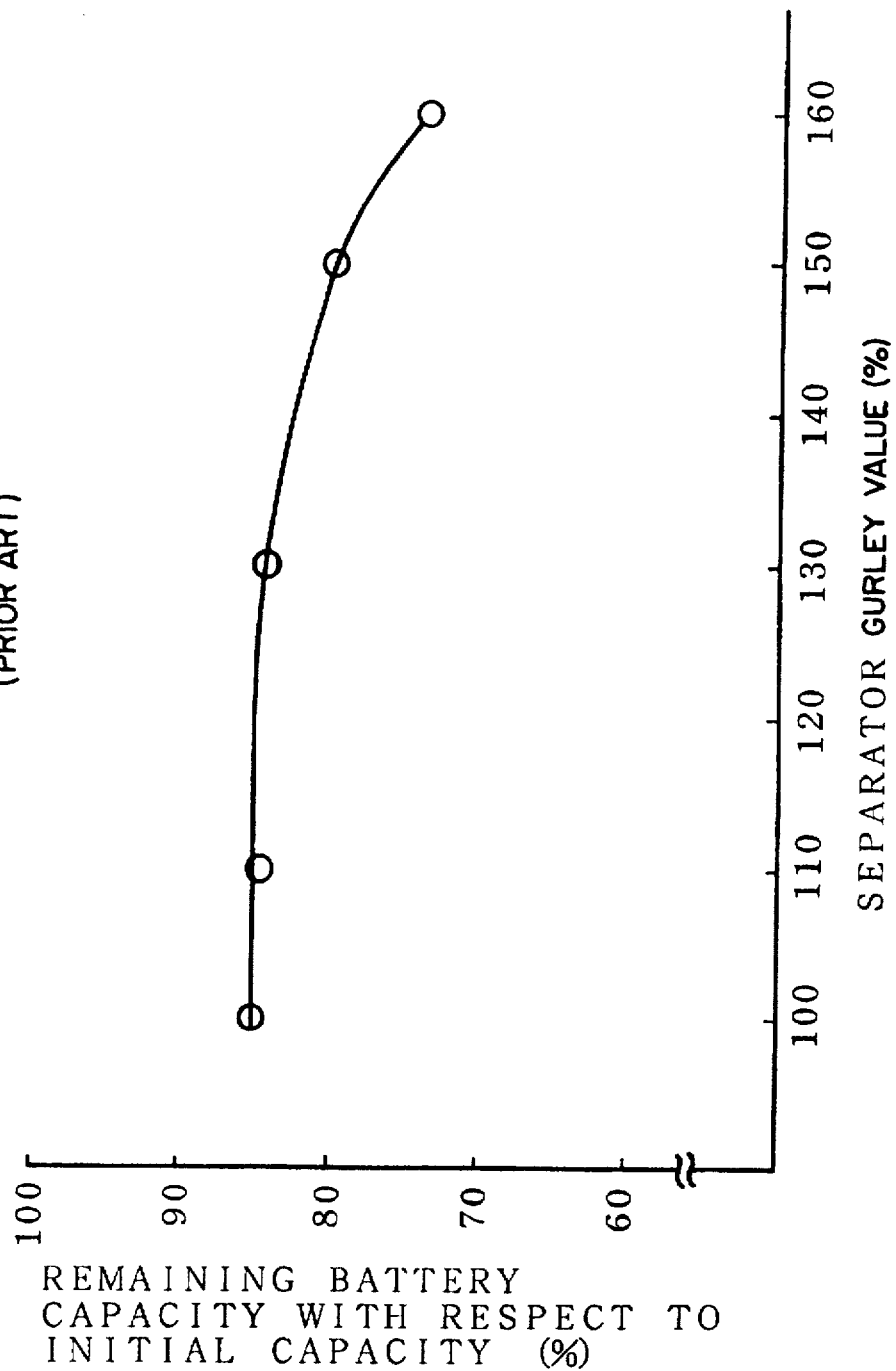
FIG. 3 is a graph showing variation in battery capacity after 300 charge-discharge cycles for batteries manufactured by a prior art method.

The non-circular spiral electrode unit 62 is a laminate of a band shaped positive electrode plate 62A, negative electrode plate 62B, and separator 62C in between, which is wound into a non-true-circular spiral shape as shown in the cross-section view of FIG. 1. The non-circular spiral electrode unit 62 is housed inside the external case 61. The outermost winding of the spiral electrode unit is an exposed region of an electrode plate core material which electrically contacts the external case. The exposed region of the outermost winding of the non-circular spiral electrode unit 62 is positive electrode plate 62A material. Consequently, the external case becomes the positive electrode. The negative electrode plate 62B has the collecting electrode tab connected at the central region of the non-circular spiral electrode unit 62.

The non-circular spiral electrode unit is manufactured in the following manner.

[POSITIVE ELECTRODE PLATE FABRICATION PROCESS]

(1) Process step to make the positive electrode slurry

After sufficient mixing of the positive electrode active material of 85 parts by weight of $LiCoO_2$, 5 parts by weight of artificial graphite powder, and 5 parts by weight of carbon black, the positive electrode slurry is formed by adding polyvinylidene fluoride (PVdF) dissolved in N-methyl-2-pyrrolidone to give 5 parts by weight of the solid component.

(2) Process step to coat the Positive electrode core material with slurry

Positive electrode slurry is applied to both sides of a conducting aluminum foil core material 324 mm long, 37.5 mm wide, and 20 µm thick. After drying, the electrode is pressed with a roll-press machine. Slurry is not applied to a region on one side of the aluminum foil core material which becomes an area of exposed aluminum surface. This region extends from one end to approximately 50 mm inward from that end. This region of exposed aluminum surface becomes the area of electrical contact with the inner surface of the external case 61. The electrode is vacuum dried for 3 hours at 110° C. to produce a band shaped positive electrode plate 62A. It is possible to use other types of sheet metal as well as aluminum for the core material. Further, the core material thickness may also be from 1.0 µm to 100 µm, and preferably from 15 µm to 50 µm.

[NEGATIVE ELECTRODE PLATE FABRICATION PROCESS]

(1) Process step to make the negative electrode slurry

Enough PVdF dissolved in N-methyl-2-pyrrolidone to give 5 parts by weight of the solid component is added to the negative electrode active material of 95 parts by weight of natural graphite powder with a particle diameter of 5 µm to 25 µm (layer thickness=3.35Å) to form the negative electrode slurry.

(2) Process step to coat the negative electrode core material with slurry

Negative electrode slurry is applied to both sides of a conducting copper foil core material 320 mm long, 39.5 mm wide, and 18 µm thick. After drying, the electrode is pressed with a roll-press machine. Slurry is not applied to a region which becomes an exposed area from the end of the copper foil core material to a point 3 mm from that end. A nickel negative electrode tab (3 mm wide) is spot welded to the exposed region. The electrode is then vacuum dried for 3 hours at 110° C. to produce a band shaped negative electrode plate 62B. Metals other than copper foil may be used as the core material, and core material thickness other than 18 µm are also possible.

[CYLINDRICAL ELECTRODE UNIT FABRICATION PROCESS]

The positive electrode plate 62A and the negative electrode plate 62B insulated from each other by the separator 62C sandwiched between them are wound into a circular cylindrical shape. The separator 62C is a polyethylene micro-porous film. However, other polyolefin based micro-porous films such as polypropylene may also be used. In addition, non-woven fiber separators with polyolefin based fibers may also be used as the separator. Separator 62C width is 41.5 mm and its thickness is 34 µm. The gurley value of the polyethylene micro-porous film used for the separator 62C is 140 sec/100 cc. During winding of the circular cylindrical electrode unit the positive electrode plate 62A, the negative electrode plate 62B, and the separator 62C are kept in intimate contact. Polypropylene adhesive tape 66 is attached to the surface of the region at the end of the electrode unit roll to attach the winding end. At the time of winding, the beginning of the positive electrode plate 62A is wound later than the beginning of the negative electrode plate 62B by an offset of approximately 11 mm. As shown in FIG. 1, this allows omission of the positive electrode plate at the first bend of the negative electrode plate. Further, the region of exposed aluminum core material of the positive electrode plate 62A is positioned at the outermost winding of the electrode unit. This allows the region of exposed aluminum core material to make electrical contact with the external case 61.

[PROCESS TO PRESS THE CYLINDRICAL ELECTRODE UNIT INTO A NON-CIRCULAR SPIRAL ELECTRODE UNIT]

The electrode unit wound into a circular cylindrical shape is compressed from both sides by pressing tool to form the electrode unit cross-section into an elongated elliptical shape as shown in FIG. 1. The time required for pressing is several seconds. If the pressing time is too short, the compressed non-circular spiral electrode unit 62 will spring back to its original shape. The position of the cylindrical electrode unit for pressing is such that the first bend is aligned with the region of negative electrode plate only as shown in FIG. 1.

The pressure of the compression to form the cylindrical electrode unit into a non-circular spiral electrode 62 unit depends on the gurley value of the separator 62C. If the cylindrical electrode unit is pressed strongly, the separator 62C gurley value increases. As separator 62C gurley value increases, the non-circular spiral electrode unit 62 is made thinner. The thickness of the positive electrode plate 62A and the negative electrode plate 62B used in the cylindrical electrode unit are adjusted to allow the non-circular spiral electrode unit 62 to be inserted tightly into the external case without forming gaps. As the positive electrode plate 62A and the negative electrode plate 62B are made thicker, the compressed non-circular spiral electrode unit 62 becomes thicker. The thickness of the positive electrode plate 62A and the negative electrode plate 62B are adjusted by the amount of slurry applied to the electrode core material.

Below, cylindrical electrode units were pressed to form non-circular spiral electrode units 62 with separators 62C having the following gurley values. Lithium ion batteries were made for embodiments 1 through 5 using the non-circular spiral electrode units 62 formed under the following press conditions. The amount of electrode active material was adjusted to allow each non-circular spiral electrode unit 62 to fit tightly into an external case 61 without gap formation. Each Lithium ion rechargeable battery was formed from a non-circular spiral electrode unit 62 by spot welding the negative electrode tab 65 to the collecting terminal of the sealing plate, inserting the non-circular spiral electrode unit 62 into an external case 61, adding electrolyte, and closing off the battery by laser welding the interface between the sealing plate 63 and the external case 61.

Embodiment 1: separator gurley value approximately 155 sec/100 cc (approximately 110% compared to an unpressed separator)

Embodiment 2: separator gurley value is approximately 170 sec/100 cc (approximately 120% compared to an unpressed separator)

Embodiment 3: separator gurley value is approximately 180 sec/100 cc (approximately 130% compared to an unpressed separator)

Embodiment 4: separator gurley value is approximately 195 sec/100 cc (approximately 140% compared to an unpressed separator)

Embodiment 5: separator gurley value is approximately 210 sec/100 cc (approximately 150% compared to an unpressed separator)

To show the relative performance of the batteries of the embodiments of the present invention, the following lithium ion rechargeable battery comparison examples were fabricated.

Comparison Example 1: separator gurley value is approximately 140 sec/100 cc (approximately 100% compared to an unpressed separator)

Comparison Example 2: separator gurley value is approximately 220 sec/100 cc (approximately 157% compared to an unpressed separator)

Comparison Example 3: separator gurley value is approximately 225 sec/100 cc (approximately 160% compared to an unpressed separator)

Figure 4:
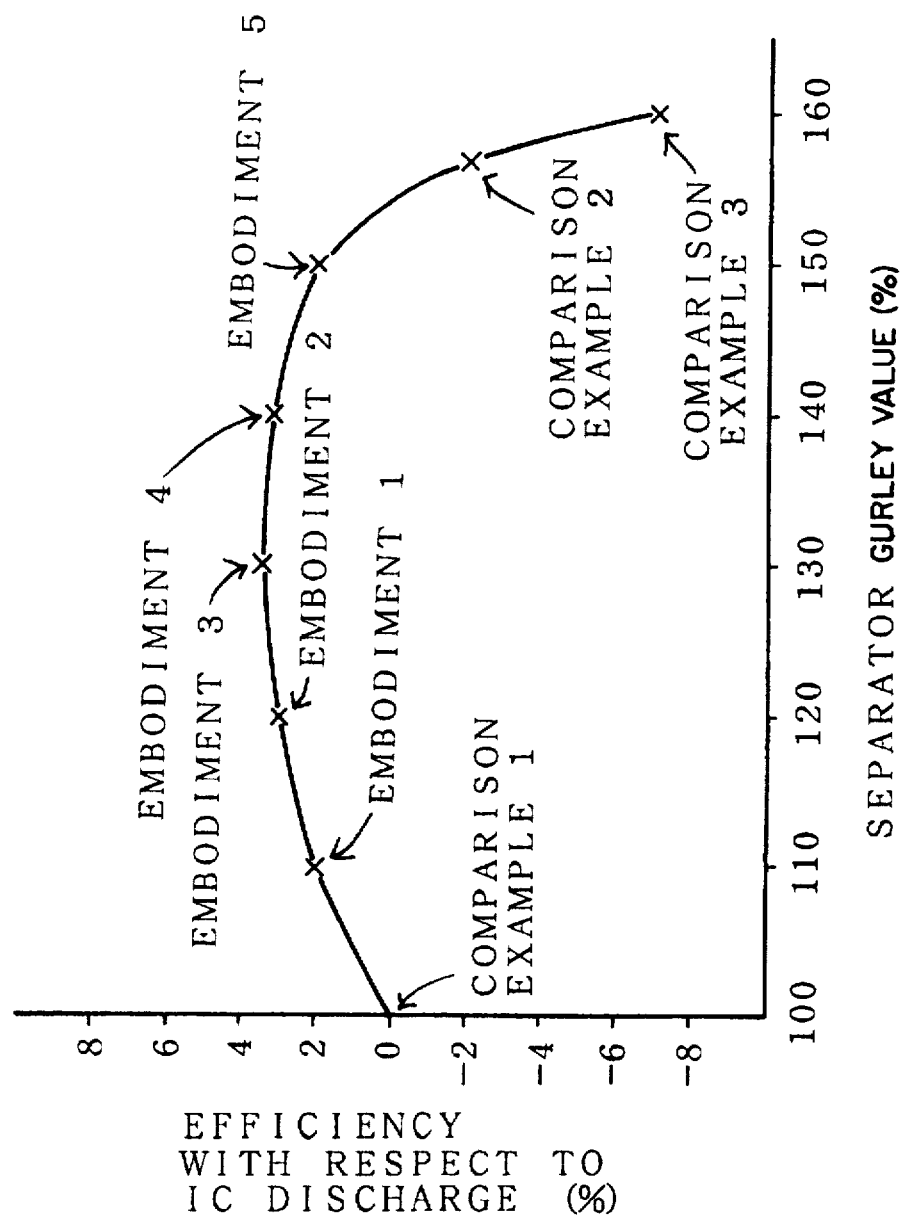
FIG. 4 is a graph showing the ratio of high rate discharge characteristic improvement as a gurley value of the separator is varied for batteries manufactured by the method of the present invention.
Figure 5:
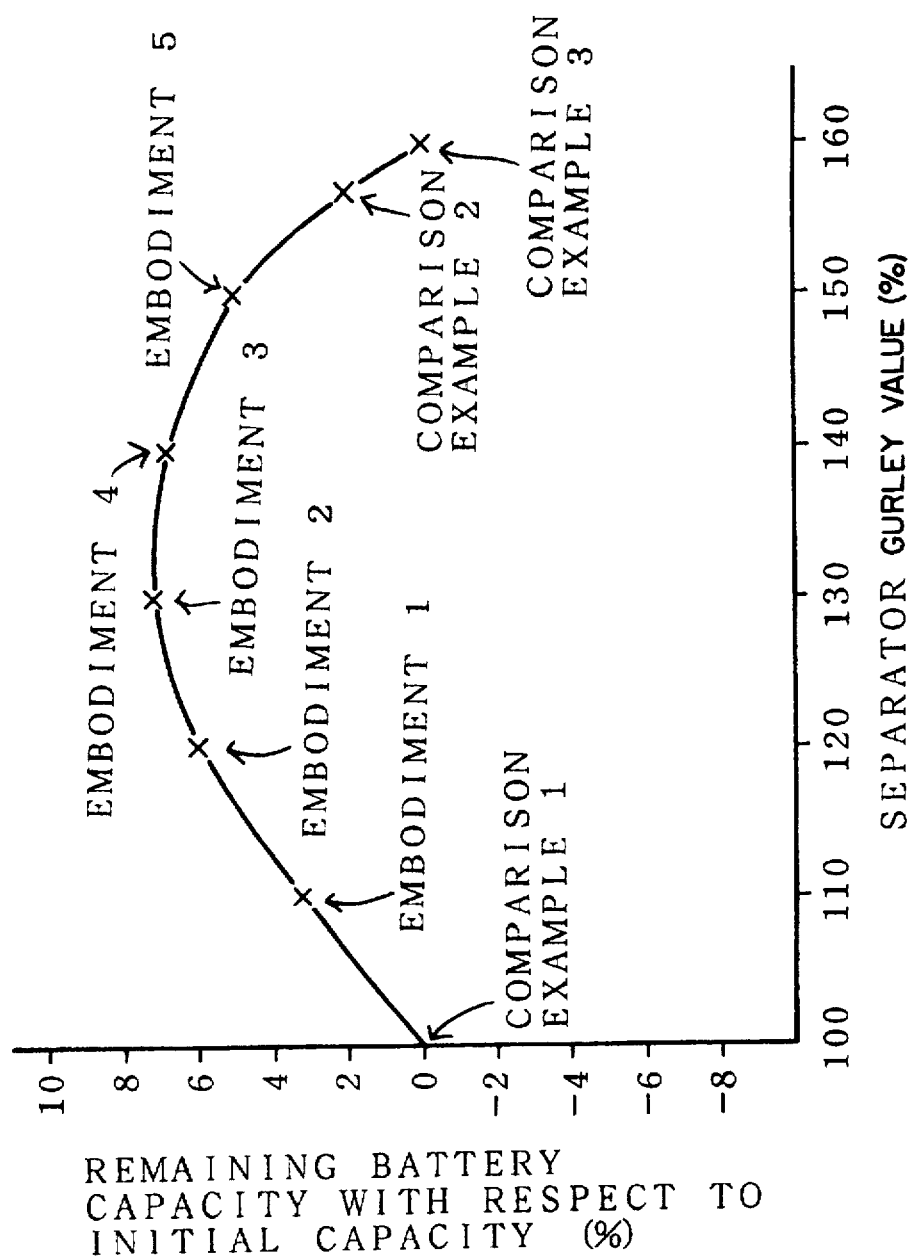
FIG. 5 is a graph showing the ratio of increase in battery capacity after 300 charge-discharge cycles as the separator gurley value is varied for batteries manufactured by the method of the present invention.

The lithium ion rechargeable batteries of the present invention, fabricated as described above and with their battery capacity referenced to 100% for a separator gurley value of 140 sec/100 cc, were subjected to high rate discharge characteristic and 300 charge-discharge cycle lifetime measurements. The resulting battery capacity after these treatments showed increased values with respect to the 100% reference as indicated in the following Table 1, FIG. 4, and FIG. 5.

TABLE 1

|  | 3C High Rate Discharge Battery Capacity Increase | 300 Charge-Discharge Cycle Battery Capacity Increase |
| --- | --- | --- |
| Embodiment 1 | +2.0% | +3.2% |
| Embodiment 2 | +3.0% | +6.0% |
| Embodiment 3 | +3.5% | +7.0% |
| Embodiment 4 | +3.0% | +6.8% |
| Embodiment 5 | +2.0% | +5.0% |
| Comparison Example 1 | 0% | 0% |
| Comparison Example 2 | −2.0% | +2.0% |
| Comparison Example 3 | −7.0% | 0% |

The method of manufacture described above winds a laminate of positive electrode plate 62A, separator 62C, and negative electrode plate 62B into a true circular cylindrical shape, then this electrode unit is pressed from both sides into a non-circular spiral shape. The method of manufacturing the battery in the present invention does not necessarily require that the positive electrode plate and negative electrode plate be wound into a true circular shape to make a cylindrical electrode unit. For example, a cylindrical electrode unit may also be made with an elliptical cross-section having a major to minor axis ratio very near 1.0, such as 1.0 to 1.2. This is because an elliptical cross-section with a major to minor axis ratio very near 1.0 can result by winding the positive and negative electrode plates very near a constant speed. An elliptically shaped cylindrical electrode unit can be pressed into a non-circular spiral electrode unit 62.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of manufacturing a battery, the method comprising:

winding a positive electrode plate and a negative electrode plate into a spiral shape to form a cylindrical electrode unit, said positive and negative electrode plates being insulated by a micro-porous polymer film separator disposed between said positive electrode plate and said negative electrode plate;

pressing said cylindrical electrode unit from opposing sides to form a non-circular spiral electrode unit, said cylindrical electrode unit being pressed until a gurley value of said micro-porous polymer film separator becomes 110% to 150% of the gurley value of said micro-porous polymer film separator prior to pressing said cylindrical electrode unit; and inserting said non-circular spiral electrode unit into an external case to form the battery.

2. The method for manufacturing a battery as claimed in claim 1, wherein said cylindrical electrode unit, formed by winding said positive and negative electrode plates insulated by said micro-porous polymer film separator, has a true circular cross-section.

3. The method for manufacturing a battery as claimed in claim 1, wherein said cylindrical electrode unit, formed by winding said positive and negative electrode plates insulated by said micro-porous polymer film separator, has an elliptical cross-section.

4. The method for manufacturing a battery as claimed in claim 3, wherein the cylindrical electrode unit has an elliptical cross-section having a ratio of major to minor axes which is less than or equal to 1.2.

5. The method for manufacturing a battery as claimed in claim 1, wherein the battery is a lithium ion rechargeable battery.

6. The method for manufacturing a battery as claimed in claim 5, further comprising coating a conducting core material with a positive electrode slurry, and roll-pressing said coated conducting core material to form said positive electrical plate.

7. The method for manufacturing a battery as claimed in claim 6, wherein said conducting core material comprises aluminum foil.

8. The method for manufacturing a battery as claimed in claim 5, coating a conducting core material with a negative electrode slurry, and roll-pressing said coated conducting core material to form said negative electrode plate.

9. The method for manufacturing a battery as claimed in claim 8, wherein said conducting core material comprises copper foil.

10. The method for manufacturing a battery as claimed in claim 1, wherein said separator comprises a polyolefin based micro-porous film.

11. The method for manufacturing a battery as claimed in claim 10, wherein said separator comprises a polyethylene micro-porous film.

12. The method for manufacturing a battery as claimed in claim 10, wherein said separator comprises a polypropylene micro-porous film.

13. The method for manufacturing a battery as claimed in claim 1, wherein said separator comprises a non-woven fiber separator with polyolefin based fibers.

14. The method for manufacturing a battery as claimed in claim 1, wherein said separator comprises a micro-porous film having a gurley value of 140 sec/100 cc.

15. The method for manufacturing a battery as claimed in claim 1, wherein said cylindrical electrode unit is pressed for several seconds during said pressing operation to achieve said non-circular spiral electrode unit.

16. The method for manufacturing a battery as claimed in claim 1, wherein the battery comprises a nickel cadmium battery.

17. The method for manufacturing a battery as claimed in claim 1, wherein the battery comprises a nickel hydrogen battery.

18. The method for manufacturing a battery as claimed in claim 1, wherein the battery comprises a hermetically sealed square cornered battery.

* * * * *